United States Patent
Mayet

(10) Patent No.: US 6,929,047 B2
(45) Date of Patent: Aug. 16, 2005

(54) APPARATUS WITH A SINGLE OSCILLATING ARM, FOR PRODUCING A TIRE REINFORCEMENT FROM A SINGLE THREAD

(75) Inventor: Jean-Claude Mayet, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 187 days.

(21) Appl. No.: 10/066,044

(22) Filed: Jan. 31, 2002

(65) Prior Publication Data

US 2002/0117251 A1 Aug. 29, 2002

(30) Foreign Application Priority Data

Feb. 7, 2001 (FR) .............................. 01 01747

(51) Int. Cl.⁷ .......................... B29D 30/10; B29D 30/16
(52) U.S. Cl. ....................... 156/397; 156/398
(58) Field of Search ................................ 156/117, 397, 156/398, 405.1, 133, 130.7, 135

(56) References Cited

U.S. PATENT DOCUMENTS 4,963,207 A * 10/1990 Laurent ...................... 156/117
5,616,209 A    4/1997 Laurent et al.
6,463,978 B2  10/2002 Mayet

FOREIGN PATENT DOCUMENTS

| EP | 0962304 A2 | 12/1999 |
| EP | 1122055 A1 | 8/2001 |
| EP | 1 122 057 A2 | 8/2001 |
| GB | 179312 | 5/1922 |

* cited by examiner

Primary Examiner—Geoffrey L. Knable
(74) Attorney, Agent, or Firm—Cohen, Pontani, Lieberman & Pavane

(57) ABSTRACT

A thread 4, intended to form a carcass reinforcement for a tire, is laid in contiguous hoops on a rigid core 1 by a system with a single oscillating arm transporting an orifice 6 so as to enable the orifice 6 to pass over a core 1 and come as near as possible to each bead of the tire, in order to lay adjacent hoops.

5 Claims, 2 Drawing Sheets

APPARATUS WITH A SINGLE OSCILLATING ARM, FOR PRODUCING A TIRE REINFORCEMENT FROM A SINGLE THREAD

TECHNICAL FIELD OF THE INVENTION

The present invention relates to the production of tires. More particularly, it concerns the putting into place of threads to form a tire reinforcement and proposes means capable of producing such a reinforcement on a form close or identical to the form of the inner cavity of the tire, that is to say, a substantially toroidal form, supporting the blank of a tire during its production.

BACKGROUND OF THE INVENTION

In this technical field, methods and apparatuses which enable the integration of the production of the tire reinforcements in the assembly of the tire itself are already known. This means that, rather than resorting to semi-finished products, such as reinforcement plies, one or more reinforcements are constructed in situ at the time the tire is produced, and from a single thread reel. Among these methods and apparatuses, the solution described in U.S. Pat. No. 5,616,209 is very particularly suitable for the construction of carcass reinforcements on a rigid core, the outer surface of which corresponds substantially to the form of the inner cavity of the final tire. The '209 patent discloses an apparatus in which the thread intended to form a carcass reinforcement is laid in contiguous hoops on a rigid core by an eyelet fixed on a chain mounted on pulleys so as to surround the core by forming a kind of "C" shape. The eyelet performs a to-and-fro movement about the core so as to lay, progressively and contiguously, one hoop on each outward journey and one hoop on each return journey, with the intervention of appropriate pressers for applying the ends of the hoops to the rigid core, precoated with crude rubber, in the process.

An apparatus likewise provided for the construction of carcass reinforcements on a rigid core, the outer surface of which corresponds substantially to the form of the inner cavity of the final tire, is known from the European Patent Application EP 0 962 304. This document discloses, in a first embodiment, a single oscillating arm, the end of which, supporting a guiding member comparable to the eyelet mentioned above, necessarily describes circular arcs. Reference may be made to FIG. 3 of the Patent Application EP 0 962 304.

With a single oscillating arm as proposed in the Patent Application EP 0 962 304, however, it is not possible to bring the thread sufficiently near to the laying zone in each of the beads. The presser devices used on either side of the core to take hold of the thread and press it against the core consequently operate with a fairly long stroke. The farther the bead is axially set back with respect to the point of the sidewall corresponding to the maximum axial width of the core, the longer the stroke of the presser devices. Apart from the fact that this might pose problems with the laying precision, the construction of the pressers is thereby rendered more awkward.

The object of the present invention is to propose an apparatus capable of operating according to the general method described in the above-mentioned U.S. Pat. No. 5,616,209, and capable of operating at considerable rates without having a detrimental effect on the operating precision.

SUMMARY OF THE INVENTION

In accordance with the invention, an apparatus is provided for producing a tire reinforcement formed from a thread delivered continuously and on request by an appropriate dispenser, such apparatus being intended to be used in cooperation with a substantially toroidal form on which the reinforcement is progressively constructed by laying hoops of the thread on a desired path for the thread on the surface of the form, the apparatus including:

a guiding member in which the thread can slide freely, a single oscillating arm, moving about a geometrical axis of rotation, the end of the arm supporting the guiding member, a control for imparting an oscillatory movement to the oscillating arm so that the guiding member is transported in a cyclical movement described in a movement plane, to and fro, in order to bring the guiding member in successive cycles into the vicinity of each of the desired ends for the thread in the desired path, pressers close to each end of the path, for applying the thread to the form at such ends, acting in synchronism with the cyclical movement of the guiding member, wherein the arm comprises, in its terminal part, a spout curved towards the form, the spout directly supporting the guiding member so as to bring the guiding member close to the form at least in the configuration assumed by the apparatus when the guiding member is close to the end of the path.

Reference is made to the above-mentioned U.S. Pat. No. 5,616,209, the subject matter of which is hereby incorporated by reference, as the present invention adopts not only the method which is described therein, but also to a large extent the pressers which intervene to enable the formation of a loop and to apply the loop against the core. As a reminder, the pressers each comprise essentially a fork and a hammer. Apart from a few details, the exemplary embodiment of the pressers which is described therein could be adopted as it is, even though a new form for the pressers is described below.

The main differences introduced by the invention concern the driving of the guiding member in which the thread can slide freely (namely the eyelet). In other words, the oscillating-arm system described below is designed to be able to take the place of the chain system described in the above-mentioned U.S. Pat. No. 5,616,209.

First of all, it should be noted that, as in the '209 patent, the term "thread" is of course to be understood in a very general sense, encompassing a monofilament, a multifilament, an assembly such as, for example, a cord or a plied yarn, or a small number of grouped cords or plied yarns, and this whatever the nature of the material, and whether or not the "thread" is precoated with rubber. In the present specification, the term "hoop" is employed to designate a length of thread extending from one singular point to another in the reinforcement armature. The whole set of the hoops arranged over the entire circumference of the tire forms the actual reinforcement. A hoop in the sense defined here may form part of a carcass, or of a crown reinforcement, or of any other type of reinforcement. These hoops may be separated by cutting the thread in the course of laying, or all may be interconnected in the final reinforcement, for example by loops.

Basically, the invention deals with the continuous laying of a reinforcement thread in a configuration as close as possible to the configuration in the final product. With the thread being delivered on request by an appropriate dispenser, comprising, for example, a thread reel and where appropriate a device for controlling the tension of the thread withdrawn from the reel, the apparatus for producing a reinforcement from a single thread cooperates with a form (rigid core or a membrane) on which the tire is produced. It is unimportant that the reinforcement is, for completeness, produced in a plurality of successive rotations of the form, with or without cutting of the thread between rotations.

When positions, directions or senses are defined with the words "radially, axially, circumferentially", or when radii are referred to, the core on which the tire is produced, or the tire by itself, is taken as the point of reference. The geometrical reference axis is the axis of rotation of the form.

Furthermore, as already indicated in the above-mentioned U.S. Pat. No. 5,616,209, the thread laying members described here also enable the construction of a reinforcement, for example a carcass reinforcement, in which the thread laying pitch is variable. The term "laying pitch" is understood to mean the distance resulting from the sum of the spacing between two adjacent threads and the diameter of the thread. It is well known that for a carcass reinforcement, the spacing between threads varies according to the radius at which it is measured. It is not a question here of this variation, but rather of a variable pitch at a given radius. For this, it is sufficient to vary the rotational speed of the form according to any appropriate law, without changing the work rate of the guiding member. This gives a tire in which the carcass reinforcement threads, for example for a radial carcass, are arranged with a pitch having a controlled variation for a given radial position.

BRIEF DESCRIPTION OF THE DRAWINGS

Reference is made to the following description for a better understanding of the invention, using the following figures in which.

DESCRIPTION OF EXEMPLARY EMBODIMENTS

Figure 1:
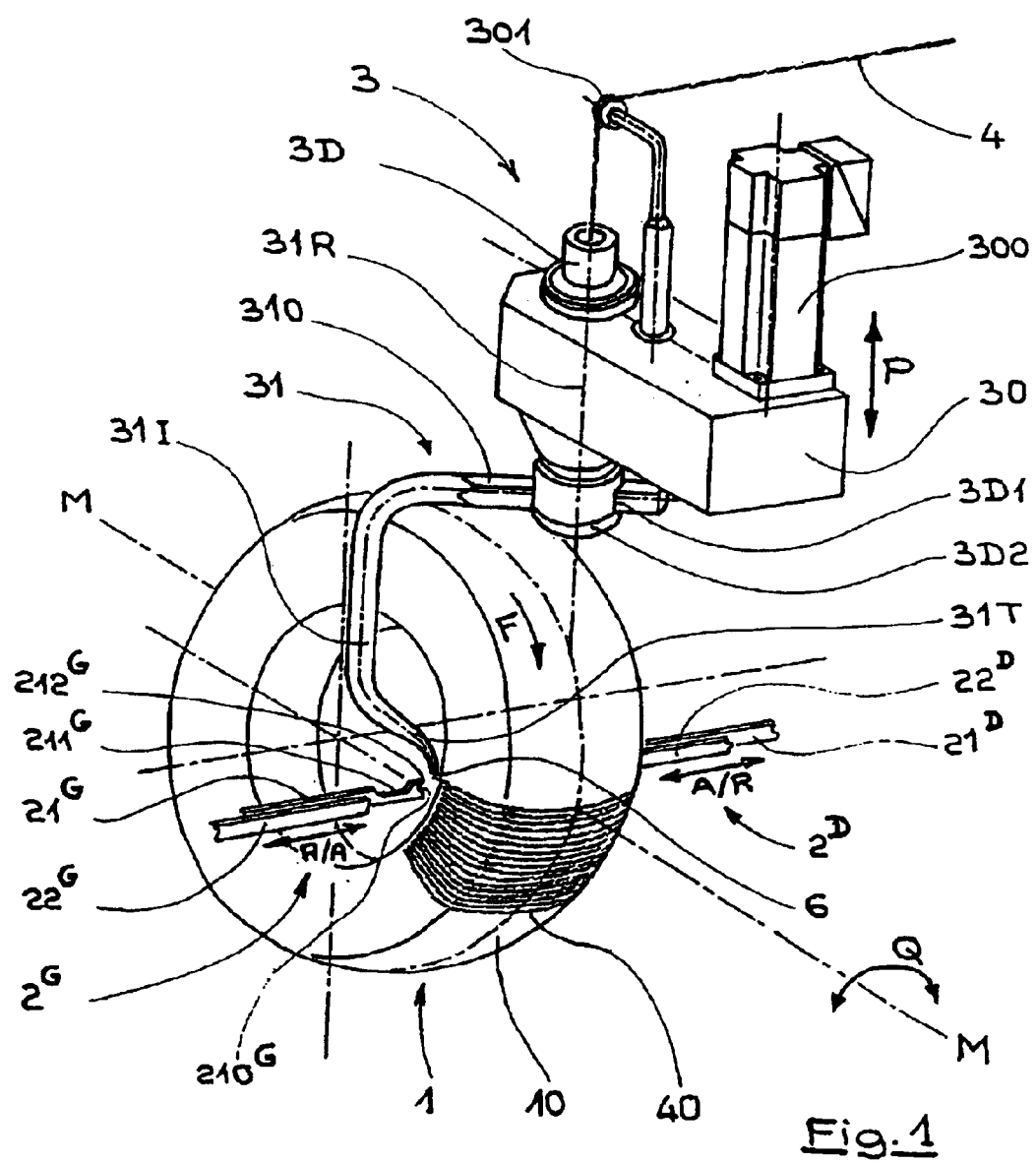
FIG. 1 is a perspective view showing an exemplary embodiment of an apparatus according to the invention.

In FIG. 1, it can be seen that the form is a core 1 (which is rigid and demountable, without however this being limiting) defining the geometry of the inner surface of the tire. The core is coated with rubber 10, for example with a layer of impermeable rubber based on butyl rubber, and with a layer of rubber for coating the carcass threads. The rubber 10 covering the core 1 enables the retention of the hoops 40 of thread 4 on the core 1 as the thread is being laid, owing to a bonding effect. The core 1 is, of course, rotationally driven by any suitable device (not shown).

The actual laying members 3 comprise essentially a system with a single oscillating arm 31, on the one hand, and presser devices $2^G$ and $2^D$ on the other hand. The oscillating arm 31 is mounted on an oscillating shaft 3D, the geometrical axis of rotation 31R of which can be seen. The geometrical axis of rotation 31R intersects the core 1, in the operation position for laying the thread 4 on the core. The oscillating arm 31 comprises a base 310 oriented substantially perpendicularly to the geometrical axis of rotation 31R. The oscillating arm 31 comprises an intermediate part 31I extending substantially parallel to the geometrical axis of rotation 31R, in the direction of the movement plane. The oscillating arm 31 comprises a spout 31T at the end of the arm 31 opposite the geometrical axis of rotation 31R. Finally, at the end of the spout 31T is an orifice 6 which fulfils the function fulfilled by the eyelet "33" in the above-mentioned U.S. Pat. No. 5,616,209. The oscillating arm 31 is mounted in a passage 3D1 formed in the shaft 3D, and is immobilised by means of an end plate 3D2. This provides a slide enabling modification of the relative position of the oscillating arm 31 on the shaft 3D, so as to be able to adjust the radius R (FIG. 3) of the circle described by the orifice 6.

The shaft 3D is mounted on a housing 30 comprising a mechanical control device, suitable for converting the rotary movement of a motor 300 into oscillatory movement imparted to the said shaft 3D. The shaft 3D oscillates within the limits of an arc, the precise value of which depends on the desired extent for the movement of the orifice 6. The control device, of the connecting rod-and-crank type or any other suitable arrangement, is easily designed in accordance with specifications depending on the intended application and is driven by a motor 300. The system with an oscillating arm 31 makes it possible to obtain an action of the apparatus, in conjunction with the presser devices $2^G$ and $2^D$, from one bead to the other.

Figure 2:
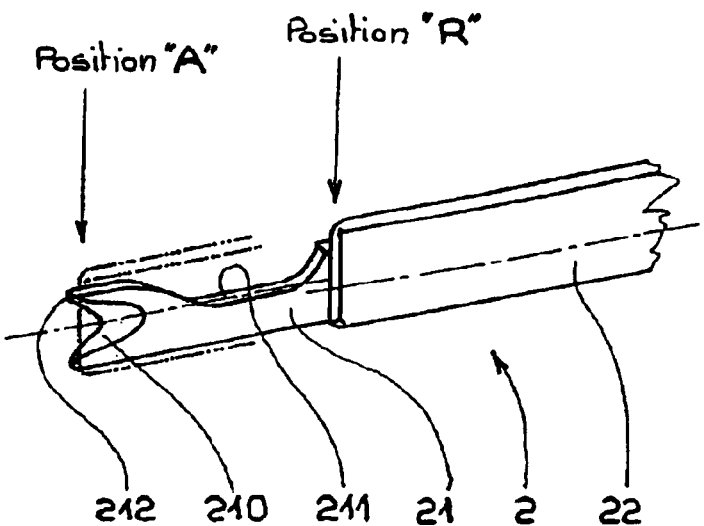
FIG. 2 is a detail of a presser of the apparatus of FIG. 1.

The presser devices $2^G$ and $2^D$ are positioned in a manner which is suitable for performing the function described in the above-mentioned U.S. Pat. No. 5,616,209. In FIG. 2, there can be seen more particularly the presser $2^D$ which comprises a fork $21^D$ and a hammer $22^D$, both being movable between a retracted position, at R (position remote from the core 1), and an advanced position, at A. These positions are marked A/R and R/A in FIG. 1. The hammer in the advanced position can be seen in broken lines (see FIG. 2). With regard to the references in the figures, the convention used is to designate each of the members of the pressers by a main reference number, for example "21" for the fork, and to indicate the fact that something belongs specifically to the presser on one side, the left-hand side or the right-hand side in FIG. 1, respectively, with the letter "G" or "D" placed as a superscript. A reference number without a specific indication refers in a general way without distinction to either of the pressers or to their members.

Reference is again made to the relevant parts of the description of the above-mentioned U.S. Pat. No. 5,616,209 for a description of the respective functions of the fork 21 and of the hammer 22 and of the respective roles of the positions referred to as advanced A and retracted R. In FIG. 2, it can be seen that both the fork 21 and the hammer 22 have the appearance of parallel strips. The fork 21 is, with respect to the hammer, always arranged radially on the side of the axis of rotation of the core 1. It should be pointed out, however, that an exactly opposite arrangement may be adopted, i.e., with the hammer 22 closer to the axis of rotation than the fork 21.

As shown in FIG. 2, the fork 21 has a nose 210 in the shape of a "V", making it possible to take hold of and center the thread 4. During the gripping phase, the plane formed by the "V" is arranged substantially perpendicularly to the thread 4. When the thread 4 is to be arranged radially, which is the case in FIG. 1, the strip forming the fork 21 is oriented tangentially to a circle concentric with the core 1. The fork 21 also comprises a recess 211, the role of which will become apparent below.

The fork 21 is intended to carry the thread 4 into contact with the core 1, and then hold it there. To this end, its advance towards the core 1 is triggered when the orifice 6 has brought the thread 4 to one end of the to-and-fro movement, that is to say, when the apparatus is substantially in the configuration of FIG. 1. The fork 21 is stopped when it has anchored the thread in the rubber coating the core 1. The fork 21 thus makes it possible to press the thread 4 down with sufficient force for it to adhere correctly at the desired location.

Taking account of the desired laying pitch, itself a function of the rotational movement of the core 1 indicated by the arrow in FIG. 1, the continuation of the movement of the oscillating-arm system 3 causes the formation of a loop about the point 212 (FIG. 2), which initiates the laying of a new hoop 40 on the core 1 (see FIG. 1). The passage of the orifice 6 beyond the fork 21 in the return phase is permitted by the recess 211, even though the fork 21 is pressed against the core 1 in this phase of the production. It should be pointed out that the size of the loop is a function of the dimension of the point 212.

The hammer 22 intervenes after the fork 21 and after the return phase of the orifice 6. In the example considered here, the hammer 22 presses on the thread 4 at a slightly higher radial position. Preferably, it still holds the thread 4 while the fork 21 is retracted. The holding of the hammer while the fork retracts helps to avoid the situation in which the fork 21 carries along with it the loop of thread 4 which has formed about one of its points 212 and which, even if it is stuck to the rubber, might have a tendency to remain attached to the fork. The anchorage of the thread 4 in the bead is thereby rendered perfectly reliable.

Of course, the movement into the advanced position and the return into the retracted position, both for the fork 21 and for the hammer 22 (see double arrows A/R and R/A in FIG. 1), are controlled in synchronism with the oscillating-arm system 3 by any suitable device (counter driving motion of the shaft 3D by an appropriate mechanical drive, for example, a belt or cable drive or by electrical synchronisation between a plurality of motors).

FIG. 1 also shows that the thread 4 is brought up to an idle pulley 301 situated substantially on the geometrical axis of rotation 31R of the oscillating arm. Next, the thread enters and makes its way along inside the oscillating arm 31, the arm being hollow.

The oscillating arm 31 causes the orifice 6 to describe a movement in which it passes over the core 1, and even skirts round it. The system with an oscillating arm 31 causes the orifice 6 to perform a movement in one plane, the "movement plane". It is necessary to take care in the construction of the edges of the orifice 6 so as not to damage the thread 4, since the emerging strand thereof is generally arranged substantially in the movement plane, that is to say, in a plane which is perpendicular to the axis of rotation 31R.

Figure 3:
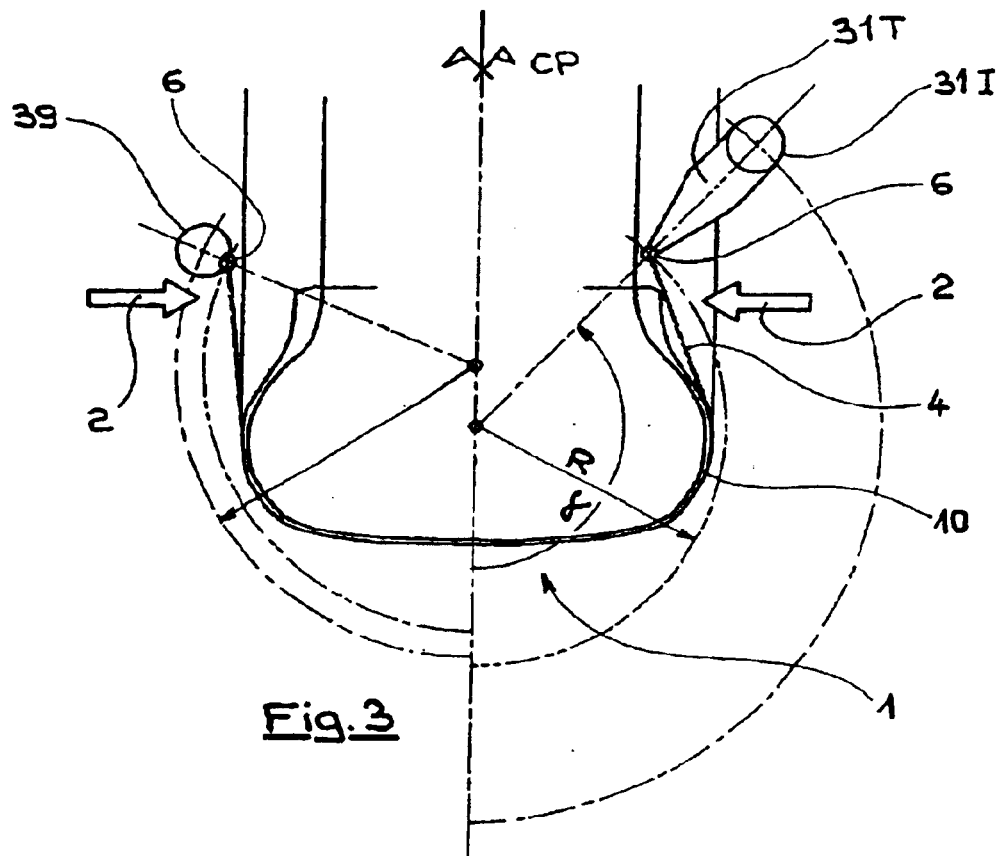
FIG. 3 compares the invention with a prior art apparatus.

In FIG. 3, the angle a represents the instantaneous position of the oscillating arm 31. The angle α varies over a sufficient extent for the laid thread to reach the end zones of the path. It is advisable for the orifice 6 to go beyond the location at which the presser device 2 intervenes. It can be seen that the orifice 6 of the shaft 31, at the end of the spout 31T, comes as close as desirable to the thread laying surface. The thread 4 is itself very close to the layer of rubber 10 along the entire sidewall, and especially at the location at which the pressers 2 take hold of it. It can be seen that the intermediate part 31I does not interfere with the form 1. The spout 31T nevertheless enables the orifice 6 to be positioned very close to the bead.

The left-hand part of FIG. 3 illustrates a prior art apparatus with a single arm 39, parallel to the geometrical axis of rotation of the said arm 39, and without a spout. The orifice 6 is arranged directly at the end of the part parallel to the geometrical axis of rotation. It can be seen that the apparatus without a spout does not make it possible to come as near to the end of the path of a thread hoop laid on the core. The large spacing of the thread 4 from the laying surface can be seen in the prior art apparatus, this making it difficult to lay the thread 4 precisely.

The orifice 6 of the apparatus according to the invention describes a to-and-fro movement from one bead to the other, or more precisely from a location close to one bead to a location close to the other bead. The basic operating cycle of the apparatus according to the invention comprises the following steps:

with the thread being held against the form for a sufficient time, displacing the orifice (guiding member) in an orifice movement plane as far as a first end, applying the thread to the form at the first end and holding it there at least for a sufficient time by means of a presser device, repeating the first step in the opposite direction as far as a second end, applying the thread to the form at the second end and holding it there by means of another presser device, and repeating the basic cycle in this way until the desired number of hoops has been laid onto the surface of the form, on a desired path for the thread on the surface of the form, by displacing the form in synchronism with the movement of the guiding member.

Even if, in this example, the orifice 6 describes a movement with a course which is symmetrical with respect to the median plane CP and reaches the vicinity of each of the bead zones defined on the core 1 in a perfectly symmetrical movement, this is not limiting. It is not excluded for the ends of the movement of the orifice not to be at points symmetrical with respect to the median plane CP, for example in order to produce a tire in which the path of the hoops is not symmetrical. This would be the case for producing a tire in which the diameters at the seat of each of the beads are different.

The previous example (FIG. 1) illustrates an apparatus laying lengths of threads from one bead to the other bead. It is also possible to construct or use apparatuses acting from one bead to a shoulder, for example for the production of a half-carcass. Indeed, it is known that the carcass of a radial tire may not be continuous from one bead to the other, but may be interrupted somewhere beneath the tread. The carcass reinforcement is in this case laid between the bead and a shoulder. An apparatus according to the invention could equally well be used for acting from a bead as far as any point beneath the tread, including as far as the opposite shoulder, with a certain degree of mutual overlapping of the half-carcasses.

It will be recalled that the orifice 6 of the apparatus according to the invention is moved cyclically in one plane, called the "orifice movement plane" here. The core 1 is rotationally driven about its axis while the orifice 6 performs its to-and-fro movements in the orifice movement plane. Of course, the movement of the core 1 is in synchronism with the to-and-fro movement of the orifice. The actual path of the hoops 40 of the thread 4 is thus both a function of the relative fixed position (which may be inclined) between the orifice movement plane and the core 1 and a function of the relative movement between the core 1 and the to-and-fro movement of the orifice 6.

In the example described, the path of the hoop 40 is substantially radial because the construction of a carcass for a radial tire is described therein, although this is, of course, not limiting. The movement plane could also form any angle, for example of the order of 75°, with respect to a plane perpendicular to the axis of rotation of the core 1, in accordance with the customary conventions for measuring angles in the field of tires. The presser devices $2^G$ and $2^D$ act in the same laying plane.

In order to construct a carcass with a crosswise arrangement in the sidewalls, it is possible to move the orifice movement plane away from a purely radial orientation by inclining the support of the laying members (such as the housing 30) about an axis parallel to the axis of rotation of the core 1. It is also possible, without any changes to the members of the apparatus as described, to change the azimuth of the core by a sizeable angle, for example ⅛ of a revolution for one to-and-fro movement of the system with an oscillating arm 31, so as to obtain a thread laying angle which is a function of the ratio of the displacements (whereas in the previous example the speed of the core 1 acted only on the single laying pitch).

The following describes a possible variant. The support of the laying members (such as the housing 30—see FIG. 1) may be moved in reciprocating fashion in order to inflect the laying path of the thread 4 on the core 1. For example, the support of the laying members may be moved in reciprocating translatory fashion (see double arrow P in FIG. 1), enabling the translation of the orifice movement plane in a direction perpendicular to the movement plane. The support of the laying members may also be moved in oscillatory fashion about a geometrical axis perpendicular to the surface of the form, contained in the movement plane and intersecting the geometrical axis of rotation of the oscillating arm (see double arrow Q about the axis M—M in FIG. 1), enabling the oscillation of the movement plane about an axis parallel to the movement plane. The support of the laying members may also be moved in oscillatory fashion about any axis parallel to the aforementioned plane. It is necessary to distinguish such a concept from a simple fixed adjustment (also possible and useful in certain cases) of the angle which the housing 30 forms about the axis M—M. This gives an additional degree of freedom for acting on the exact form of the path of the thread 4.

The laying members as a whole, namely the system with an oscillating arm 31 and the presser devices 2, including the motor and the drive mechanism, form a subassembly which can easily be brought up to the core in an appropriate manner, and can be withdrawn in order, for example, to bring up to the core other devices used for the production of a tire or for taking the core away to other stations for making a tire.

What is claimed is:

1. Apparatus for producing a tire reinforcement formed from a thread delivered continuously and on request by an appropriate dispenser, the apparatus being intended to be used in cooperation with a substantially toroidal form on which the reinforcement is progressively constructed by laying hoops of the thread between ends of a desired thread path on the surface of the form, the apparatus comprising:

a guiding member in which the thread can slide freely, a solid oscillating arm, moving in an arcuate path about a geometrical axis of rotation, wherein a terminal end of the oscillating arm supports said guiding member, and moves in an arcuate path lying externally of the form, a control for imparting an oscillatory movement to the oscillating arm so that the guiding member is transported in a cyclical movement described in a movement plane, to and fro, in order to bring the guiding member in successive cycles into the vicinity of each of the ends of the desired thread path without substantially coming into contact with the form, a presser close to each end of the said path, for applying the thread to the form at the ends of the desired thread path, acting in synchronism with the cyclical movement of the guiding member, and the oscillating arm comprising said terminal part, one end coupled to said control, and an intermediate part between said one end and said terminal part, wherein said terminal part includes a spout extending between said intermediate part and said guiding member, said spout being inclined with respect to said geometrical axis of rotation and extends inwardly toward the form, the spout directly supporting the guiding member so as to bring the guiding member close to the form at least in the configuration assumed by the apparatus when the guiding member is close to the end of the path.

2. Apparatus according to claim 1, in which the geometrical axis of rotation of the oscillating arm intersects the form in the working position.

3. Apparatus according to claim 1, in which a base of the oscillating arm, located at said one end of said oscillating arm, is substantially oriented perpendicularly to the geometrical axis of rotation of the oscillating arm, and wherein said intermediate part is oriented substantially parallel to the geometrical axis of rotation of the oscillating arm.

4. Apparatus according to claim 1, in which the guiding member comprises an orifice at the end of the oscillating arm, the oscillating arm being hollow and having said thread passing therethrough.

5. Apparatus according to claim 1, in which said intermediate part is oriented substantially parallel to the geometrical axis of rotation of the oscillating arm, and the spout forms an angle with respect to said intermediate part so that it approaches progressively closer to the form.

* * * * *